(12) United States Patent
Kim et al.

(10) Patent No.: US 10,587,566 B2
(45) Date of Patent: Mar. 10, 2020

(54) DATA TRANSMISSION METHOD AND ELECTRONIC DEVICE FOR SUPPORTING THE SAME

(71) Applicant: Samsung Electronics Co., Ltd., Gyeonggi-do (KR)

(72) Inventors: Sung Eun Kim, Gyeonggi-do (KR); Dong Jae Shin, Gyeonggi-do (KR); Yo Han Lee, Gyeonggi-do (KR); Doo Suk Kang, Gyeonggi-do (KR); Yong Joon Jeon, Gyeonggi-do (KR); Eun Jung Hyun, Seoul (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 15/810,727

(22) Filed: Nov. 13, 2017

(65) Prior Publication Data
US 2018/0131664 A1    May 10, 2018

(30) Foreign Application Priority Data
Nov. 10, 2016 (KR) .................... 10-2016-0149719

(51) Int. Cl.
*H04L 12/66* (2006.01)
*H04L 12/58* (2006.01)
(Continued)

(52) U.S. Cl.
CPC .............. *H04L 51/38* (2013.01); *H04L 51/10* (2013.01); *H04L 51/16* (2013.01); *H04L 69/14* (2013.01);
(Continued)

(58) Field of Classification Search
USPC ................ 709/206, 202, 204, 207, 217, 230
See application file for complete search history.

(56) References Cited

U.S. PATENT DOCUMENTS 7,804,823 B2 * 9/2010 Toscano ................ H04L 51/066
370/356
8,676,135 B2 * 3/2014 Hong .................. H04N 21/8113
455/345
(Continued)

FOREIGN PATENT DOCUMENTS

| CN | 105450850 | 3/2016 |
| KR | 2002-0011033 | 2/2002 |

(Continued)

OTHER PUBLICATIONS

European Search Report dated Mar. 22, 2018 issued in counterpart application No. 17200729.6-1213, 7 pages.
(Continued)

*Primary Examiner* — Jude Jean Gilles
(74) *Attorney, Agent, or Firm* — The Farrell Law Firm, P.C.

(57) ABSTRACT

An electronic device includes a display, a communication interface, a processor electrically connected with the display and the communication interface, and a memory electrically connected with the processor. The memory stores instructions that cause the processor to execute a message transmission application configured to transmit or receive data through a first communication mode, select at least one message thread from a list of messages transmitted and received in the message transmission application, and establish a channel according to a second communication mode with an external electronic device based on identification information of the external electronic device associated with the selected message thread.

20 Claims, 14 Drawing Sheets

(51) Int. Cl.
    *H04L 29/06*     (2006.01)
    *H04W 88/06*     (2009.01)
    *H04W 4/14*     (2009.01)
    *H04W 48/18*     (2009.01)
    *G06F 3/12*     (2006.01)
    *H04W 4/80*     (2018.01)

(52) U.S. Cl.
    CPC ............. *H04L 69/18* (2013.01); *H04W 4/14* (2013.01); *H04W 48/18* (2013.01); *H04W 88/06* (2013.01); *H04W 4/80* (2018.02)

(56) References Cited

U.S. PATENT DOCUMENTS

| | | | |
|---|---|---|---|
| 8,693,643 B2 | 4/2014 | Mikan et al. | |
| 9,338,027 B2 | 5/2016 | Talwar et al. | |
| 9,425,988 B2* | 8/2016 | Smith | H04L 12/5692 |
| 9,699,718 B2* | 7/2017 | Ramachandran | H04W 48/18 |
| 9,749,464 B2 | 8/2017 | Kim | |
| 9,819,800 B2 | 11/2017 | Talwar et al. | |
| 9,986,099 B2 | 5/2018 | Talwar et al. | |
| 10,003,944 B2 | 6/2018 | Choi et al. | |
| 2002/0013154 A1 | 1/2002 | Soh et al. | |
| 2003/0139175 A1 | 7/2003 | Kim | |
| 2004/0008723 A1 | 1/2004 | Uchida et al. | |
| 2004/0202117 A1* | 10/2004 | Wilson | H04L 12/1827 370/310 |
| 2007/0140191 A1* | 6/2007 | Kojima | H04W 76/23 370/338 |
| 2008/0233942 A9 | 9/2008 | Kim | |
| 2010/0035594 A1* | 2/2010 | Vendrow | H04M 3/436 455/417 |
| 2010/0273450 A1 | 10/2010 | Papineau et al. | |
| 2011/0317663 A1 | 12/2011 | Choi et al. | |
| 2013/0121481 A1 | 5/2013 | Mikan et al. | |
| 2013/0124306 A1 | 5/2013 | Hutchinson et al. | |
| 2013/0156167 A1 | 6/2013 | Talwar et al. | |
| 2013/0225153 A1 | 8/2013 | Kim et al. | |
| 2014/0149872 A1 | 5/2014 | Komori | |
| 2015/0312742 A1 | 10/2015 | Choi et al. | |
| 2016/0026352 A1* | 1/2016 | Brown | G06F 3/0484 715/752 |
| 2016/0026367 A1* | 1/2016 | Brown | G06F 3/04817 715/835 |
| 2016/0028875 A1* | 1/2016 | Brown | G06F 3/0481 715/751 |
| 2016/0088149 A1 | 3/2016 | Kim | |
| 2016/0227040 A1 | 8/2016 | Talwar et al. | |
| 2017/0331957 A1 | 11/2017 | Talwar et al. | |

FOREIGN PATENT DOCUMENTS

| | | |
|---|---|---|
| KR | 2002-0062578 | 7/2002 |
| KR | 1020060082698 | 7/2006 |
| KR | 10-2007-0067281 | 6/2007 |
| KR | 10-2010-0085172 | 7/2010 |
| KR | 10-2011-0134774 | 12/2011 |
| KR | 10-2012-0001353 | 1/2012 |
| KR | 10-2012-0014181 | 2/2012 |
| KR | 10-2012-0025030 | 3/2012 |
| KR | 10-2012-0048525 | 5/2012 |
| KR | 10-2012-0052103 | 5/2012 |
| KR | 10-2013-0012225 | 2/2013 |
| KR | 10-20140027991 | 3/2014 |
| KR | 10-2014-0087056 | 7/2014 |

OTHER PUBLICATIONS

Chinese Office Action dated Nov. 13, 2019 issued in counterpart application No. 201711099411.0, 17 pages.

* cited by examiner

DATA TRANSMISSION METHOD AND ELECTRONIC DEVICE FOR SUPPORTING THE SAME

PRIORITY

This application claims priority under 35 U.S.C. § 119(a) to a Korean Patent Application filed in the Korean Intellectual Property Office on Nov. 10, 2016 and assigned Serial Number 10-2016-0149719, the contents of which is incorporated herein by reference.

BACKGROUND

1. Field of the Disclosure

The present disclosure relates generally to an external electronic device, and more particularly, to a method for transmitting and receiving data with the electronic device.

2. Description of the Related Art

Electronic devices, such as smartphones and tablet personal computers (PCs), may perform a variety of functions, such as message transmissions, voice calls, video calls, playback of videos, and Internet searches, and may transmit and receive a messages or data, such as images and videos, with an external device through an application. The electronic device may drive message transmission applications. A user who is using a message transmission application may transmit a text message or a multimedia message, such as an image and a video attachment image, to an electronic device of a counterpart using the message transmission application.

Further, if transmitting a file, such as a photo or video, to an external electronic device, an electronic device may transmit the file through a long-range communication mode (e.g., cellular communication using a base station) or a short-range communication mode (e.g., wireless-fidelity (Wi-Fi) direct or Bluetooth®).

If transmitting data through short-range communication, an electronic device scans a device through a separate setting screen. After short-range communication is connected, the electronic device may perform a complex process of selecting a data transfer file. Due to inconvenience of establishing short-range communication, if transmitting data to an external device located within a short range, a user may transmit a multimedia file using a long-range communication mode, which adds a fee. In this case, a wireless data communication fee for using wireless data may be increased.

The electronic device according to the related art may provide a variety of schemes (e.g., S-beam, AirDrop, and quick connect) for establishing and executing short-range communication. In this case, short-range communication schemes may be used infrequently due to a complex establishment process or a different establishment process for each device.

As such, there is a need in the art for a method and apparatus that improve the ease of use for electronic devices.

SUMMARY

Aspects of the present disclosure are to address at least the above-mentioned problems and/or disadvantages and to provide at least the advantages described below. Accordingly, an aspect of the present disclosure is to provide an electronic device including a display, a communication interface, a processor electrically connected with the display and the communication interface, and a memory electrically connected with the processor. The memory may store instructions that cause the processor to execute a message transmission application configured to transmit or receive data through a first communication mode, select at least one message thread from a list of messages transmitted and received in the message transmission application, and establish a channel according to a second communication mode with an external electronic device based on identification information of the external electronic device associated with the selected message thread.

A data transmission method and an electronic device for supporting the same according to aspects of the present disclosure may selectively perform data transmission according to long-range communication and short-range communication using one interface of a message transmission application. reduce billing according to cellular communication by transmitting media data and the like using a short-range communication mode which does not incur a communication fee, and use quicker short-range communication than cellular communication through simple execution in a message transmission application.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
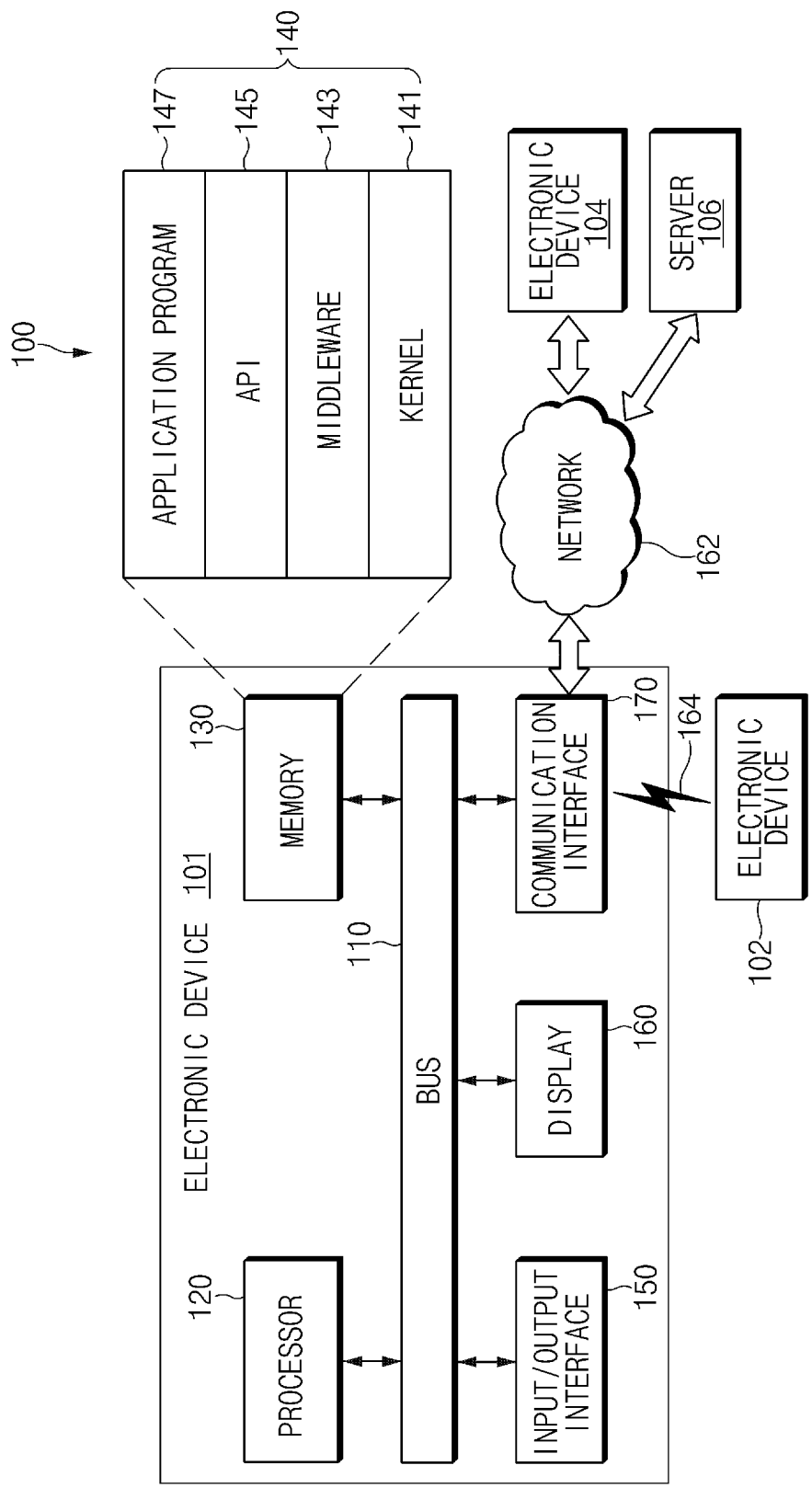
FIG. 1 is a block diagram illustrating a configuration of an electronic device in a network environment.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "have", "may have", "include", "comprise", "may include" and "may comprise", used herein, indicate existence of corresponding features (for example, elements such as numeric values, functions, operations, or components) but do not exclude presence of additional features.

The expressions "A or B", "at least one of A or/and B", or "one or more of A or/and B", used herein, include any and all combinations of one or more of the associated listed items. For example, the term "A or B", "at least one of A and B", or "at least one of A or B" may refer to each of the cases (1) where at least one A is included, (2) where at least one B is included, or (3) where both of at least one A and at least one B are included.

The terms such as, "first" and "second", used herein, refer to various elements of aspects of the present disclosure, but do not limit the elements. For example, such terms are used only to distinguish an element from another element and do not limit the order and/or priority of the elements. A first user device and a second user device may represent different user devices irrespective of sequence or importance. Without departing the scope of the present disclosure, a first element may be referred to as a second element, and similarly, a second element may be referred to as a first element.

When an element (for example, a first element) is referred to as being "operatively (or communicatively) coupled with/to", or "connected to", another element (for example, a second element), it can be directly coupled with/to or connected to the other element or an intervening element (for example, a third element). In contrast, when an element (for example, a first element) is referred to as being "directly coupled with/to" or "directly connected to" another element (for example, a second element), it should be understood that there is no intervening element (for example, a third element).

The expression "configured to" used herein may be used to mean, "suitable for", "having the capacity to", "designed to", "adapted to", "made to", or "capable of". The term "configured to (or set to)" is not limited to "specifically designed to" in hardware. Instead, the expression "a device configured to" may mean that the device is "capable of" operating together with another device or other components. A central processing unit (CPU), such as a "processor configured to (or set to) perform A, B, and C", may mean a dedicated processor (for example, an embedded processor) for performing a corresponding operation or a generic-purpose processor (for example, (CPU) or an application processor (AP)) which may perform corresponding operations by executing one or more software programs stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in embodiments of the present disclosure. In some cases, even if terms are defined in the specification, they may not be interpreted to exclude embodiments of the present disclosure.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to embodiments of the present disclosure, the wearable devices may include accessories, such as watches, rings, bracelets, ankle bracelets, glasses, contact lenses, or head-mounted devices (HMDs), cloth-integrated types, such as electronic clothes, body-attached types (for example, skin pads or tattoos), or implantable types, such as implantable circuits.

In some embodiments of the present disclosure, the electronic device may be one of home appliances. The home appliances may include at least one of a digital video disk (DVD) player, an audio, a refrigerator, an air conditioner, a cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ or PlayStation™, an electronic dictionary, an electronic key, a camcorder, or an electronic panel.

In an embodiment of the present disclosure, the electronic device may include at least one of various medical devices (for example, various portable medical measurement devices including a blood glucose meter, a heart rate measuring device, a blood pressure measuring device, and a body temperature measuring device), magnetic resonance angiography (MRA), magnetic resonance imaging (MRI) device, computed tomography (CT) device, a photographing device, an ultrasonic device, a navigation system, a global navigation satellite system (GNSS), an event data recorder (EDR), a flight data recorder (FDR), a vehicular infotainment device, electronic devices for vessels, such as a navigation device and a gyro compass, avionics, a security device, a vehicular head unit, an industrial or home robot, an automatic teller machine (ATM) of a financial company, a point of sales (POS) device, or an Internet of things device, such as a light bulb, various sensors, an electricity or gas meter, a spring cooler device, a fire alarm device, a thermostat, an electric pole, a toaster, a sporting apparatus, a hot water tank, a heater, and a boiler.

According to some embodiments of the present disclosure, the electronic device may include at least one of a furniture or a part of a building/structure, an electronic board, an electronic signature receiving device, a projector, or various measurement devices including a water service, electricity, gas, or electric wave measuring device. The electronic device may be one or a combination of the aforementioned devices and may be a flexible electronic device, but is not limited to the aforementioned devices, and may include new electronic devices produced due to the development of new technologies.

Hereinafter, electronic devices according to an embodiment of the present disclosure will be described with reference to the accompanying drawings. The term "user" used herein may refer to a person who uses an electronic device or may refer to an artificial intelligence electronic device that uses an electronic device.

A description is provided of an electronic device 101 in a network environment 100 in embodiments with reference to FIG. 1.

The electronic device 101 may include a bus 110, a processor 120, a memory 130, an input/output interface 150, a display 160, and a communication interface 170. In embodiments of the present disclosure, at least one of the foregoing elements may be omitted or another element may be added to the electronic device 101.

The bus 110 may include a circuit for connecting the above-mentioned elements 110 to 170 to each other and transferring communications, such as control messages and/or data, between the above-mentioned elements.

The processor 120 may include at least one of a CPU, an AP, or a communication processor (CP). The processor 120 may perform data processing or an operation related to communication and/or control of at least one of the other elements of the electronic device 101.

The processor 120 may output a user interface for transmitting message data using short-range communication or long-range communication on a display 160 using an interactive message transmission application. Additional information about a method of using a message transmission application at the processor 120 may be provided with reference to FIG. 2A to FIG. 10.

The memory 130 may include a volatile memory and/or a nonvolatile memory and may store instructions or data related to at least one of the other elements of the electronic device 101. According to an embodiment of the present disclosure, the memory 130 may store software and/or a program 140. The program 140 may include a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources, such as the bus 110, the processor 120, or the memory 130, to perform operations or functions of the middleware 143, the API 145, or the application program 147. Furthermore, the kernel 141 may provide an interface for allowing the middleware 143, the API 145, or the application program 147 to access individual elements of the electronic device 101 to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign a priority to at least one application program 147 using the system resources, such as the bus 110, the processor 120, or the memory 130, of the electronic device 101. The middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, at least one interface or function (e.g., instructions) for file control, window control, image processing, or character control.

The input/output interface 150 may transfer an instruction or data input from a user or another external device to another element(s) of the electronic device 101. Furthermore, the input/output interface 150 may output instructions or data received from another element(s) of the electronic device 101 to the user or another external device.

The display 160 may include a liquid crystal display (LCD), a light-emitting diode (LED) display, an organic light-emitting diode (OLED) display, a microelectromechanical systems (MEMS) display, or an electronic paper display. The display 160 may present text, images, videos, icons, or symbols to the user. The display 160 may include a touch screen and receive a touch, a gesture, a proximity or hovering input from an electronic pen or a part of a user's body.

The communication interface 170 may set communications between the electronic device 101 and an external device, such as a first external electronic device 102, a second external electronic device 104, or a server 106, and may be connected to a network 162 via wireless communications or wired communications so as to communicate with the external device.

The wireless communications is a cellular communication protocol such as long-term evolution (LTE), LTE-advance (LTE-A), code division multiple access (CDMA), wideband CDMA (WCDMA), universal mobile telecommunications system (UMTS), wireless broadband (WiBro), or a global system for mobile communications (GSM). The wireless communications may include a short-range communications 164 which may include at least one of wireless fidelity (Wi-Fi), Bluetooth®, near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS device. The POS device may detect the magnetic signals by using a MST reader and restore data by converting the detected electromagnetic signals into electrical signals.

The GNSS may include at least one of a global positioning system (GPS), a global navigation satellite system (Glonass), a Beidou navigation satellite system (Beidou), the European global satellite-based navigation system (Galileo), according to a use area or a bandwidth. Hereinafter, the term "GPS" and the term "GNSS" may be interchangeably used.

The wired communications may include at least one of a universal serial bus (USB), a high definition multimedia interface (HDMI), a recommended standard 832 (RS-232), or a plain old telephone service (POTS). The network 162 may include at least one telecommunications network, such as a, computer network, a local area network (LAN), a wide area network (WAN)), the Internet, and a telephone network.

According to embodiments of the present disclosure, a communication interface 170 may transmit message data according to a first communication mode or a second communication mode with the same external electronic device under the control of the processor 120. The first communication mode may be a long-range communication mode, such as cellular communication using a base station. The second communication mode may be a short-range communication mode, such as Wi-Fi direct or Bluetooth®.

The first external electronic device 102 and the second external electronic device 104 may be the same as or different from the type of the electronic device 101. According to an embodiment of the present disclosure, the server 106 may include a group of one or more servers. A portion or all of the operations performed in the electronic device 101 may be performed in the first electronic device 102, the second external electronic device 104, or the server 106. When the electronic device 101 performs a certain function or service automatically, or in response to a request, the electronic device 101 may request at least a portion of the functions related to the function or service from another device, such as the first electronic device 102, the second external electronic device 104, or the server 106, instead of or in addition to performing the function or service for itself. The first electronic device 102, the second external electronic device 104, or the server 106, may perform the requested function or additional function, and may transfer a result to the electronic device 101. The electronic device 101 may use a received result itself or additionally process the received result to provide the requested function or service. To this end, a cloud computing technology, a distributed computing technology, or a client-server computing technology may be used.

According to embodiments of the present disclosure, a first external electronic device 102 may be the same device as a second external electronic device 104. For example, an external electronic device (hereinafter "second electronic device") which is chatting with the electronic device 101 (hereinafter "first electronic device") through a cellular communication using a message transmission application, such as KakaoTalk®, Line®, WeChat®, WhatsApp®, Tango®, or Hangouts®, and a network 162 may be connected with the electronic device 101 through short-range communication of the present disclosure.

Figure 2A:
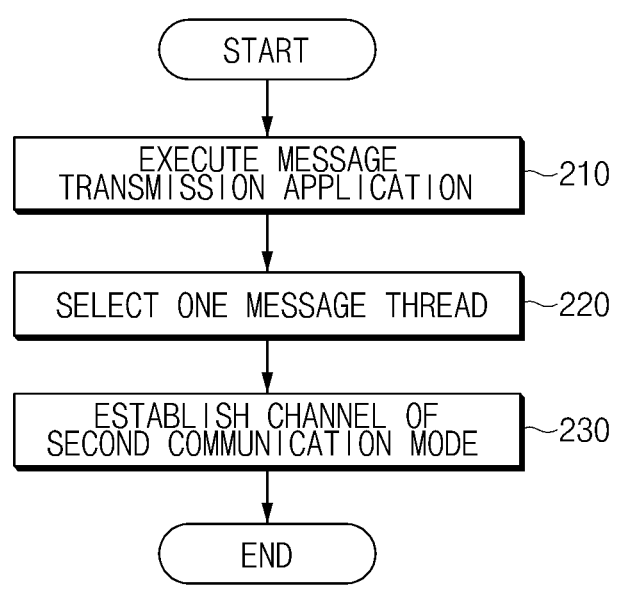
FIG. 2A is a flowchart illustrating a data transmission method, according to various embodiments.

FIG. 2A is a flowchart illustrating a data transmission method, according to various embodiments.

In step 210, a processor 120 of FIG. 1 executes a message transmission application. The message transmission application may transmit and receive message data about a text, photo, or video, with a second electronic device 102 of FIG. 1 through a first communication mode using an external base station or an external server. The message transmission application may be an app such as KakaoTalk®, Line®, WeChat®, WhatsApp®, Tango®, or Hangouts®. The message transmission application may be installed for transmitting and receiving a message by a mobile network operator (MNO) which provides cellular communication or a manufacturer which produces an electronic device 101.

The message transmission application may be executed in response to a user input or may be automatically executed according to reception of a message from the outside or by a call of another app.

In step 220, the processor 120 selects at least one message thread from a list of messages transmitted and received at a message transmission application. The list may be for arranging names and phone numbers of counterparts who transmit and receive messages in a specified time order. The message thread may be for each item to configure the list of messages transmitted and received and may be displayed to be distinguished according to identification information, such as a name or phone number of a counterpart. For example, if a message is transmitted and received with user A, a first message thread associated with user A may be arranged on the top of the list of transmitted and received messages. Thereafter, if a message is transmitted and received with user B, a second message thread associated with user B may be arranged on the top of the list of transmitted and received messages and the first message thread associated with user A may be arranged below the second message thread.

The processor 120 may select at least one message thread from the list of transmitted and received messages, based on a user input. For example, the processor 120 may select a message thread corresponding to a point where a touch input of the user occurs.

If one message thread is selected in the list of transmitted and received messages by the user, the processor 120 may display a message output screen associated with the selected message thread. The message output screen may be a screen which displays contents of a transmitted and received message in an order and a time when the message is transmitted and received, in an interactive manner.

According to an aspect of the present disclosure, the processor 120 may scan the second electronic device 102 based on the message thread selected according to the user input.

According to an aspect of the present disclosure, the processor 120 may scan the second electronic device 102 based on a message thread selected by automatic execution. The processor 120 may automatically determine the message thread based on at least one of a time when a message is transmitted and received, the number of times the message is transmitted and received, or call history information. For example, the processor 120 may scan the second electronic device 102 based on a message thread associated with the latest received message.

In another embodiment of the present disclosure, if the user reads a message through another sub-device, such as a smart watch, a smart band, or a tablet PC, which interworks with the first electronic device 101, the processor 120 may scan the second electronic device 102 based on a message thread associated with the message read through the sub-device.

In step 230, the processor 120 may establish a channel according to a second communication mode with the second electronic device 102 based on identification information of the second electronic device 102 associated with the selected message thread. The identification information of the second electronic device 102 may be unique information, such as a counterpart's phone number or a counterpart's name, for distinguishing the second electronic device 102 from other devices.

The second communication mode may be a communication mode for establishing a channel with the second electronic device 102 located around the electronic device 101 and transmitting and receiving message data. The second communication mode may be a short-range communication mode such as Wi-Fi direct or Bluetooth®. If the second communication mode is used, a separate communication fee may not be generated or may fail to be different from wireless data communication using a base station or a server.

The processor 120 may transmit a request signal by a unicast scheme based on identification information. For example, a request signal for establishing a channel may include identification information about the second electronic device 102. The second electronic device 102 may compare the identification information included in the request signal with its identification information, and if the identification information included in the request signal is identical to the identification information of the second electronic device 102, the second electronic device 102 may transmit a response signal.

The processor 120 may transmit a request signal depending on a multicast scheme and a broadcast scheme, such as a beacon signal, and may verify whether there is the second electronic device 102 corresponding to stored identification information in a received response signal.

The processor 120 may display a connection indication (or an icon) for establishing a channel according to the second communication mode on at least part of a message output screen. The connection indication may be at least one of a change in background color, generation of an icon, generation of a touch button, or an animation effect on an object on the screen. Additional information about an output of the connection indication may be provided with reference to FIG. 5.

According to embodiments of the present disclosure, if each of the channels of the first communication mode and the second communication mode is established between the first electronic device 101 and the second electronic device 102, the processor 120 may transmit message data using one of the first communication mode or the second communication mode based on a type or size of the transmitted message data.

If message data is text data, the processor 120 may transmit the message data using the first communication mode, and if the message data is image or video data, the processor 120 may transmit the message data using the second communication mode.

If the message data is data (or a file) of a specified size (e.g., 1 MByte) or less, the processor 120 may transmit the message data using the first communication mode. If the message data is data of greater than the specified size, the processor 120 may transmit the message data using the second communication mode.

According to embodiments of the present disclosure, the processor 120 may display transmission and reception information of message data by the second communication mode on a message output screen to be different from transmission and reception information by the first communication mode. For example, the processor 120 may display a transmission of message data by the first communication mode using a black color and may display a transmission of message data by the second communication mode using a blue color.

Figure 2B:
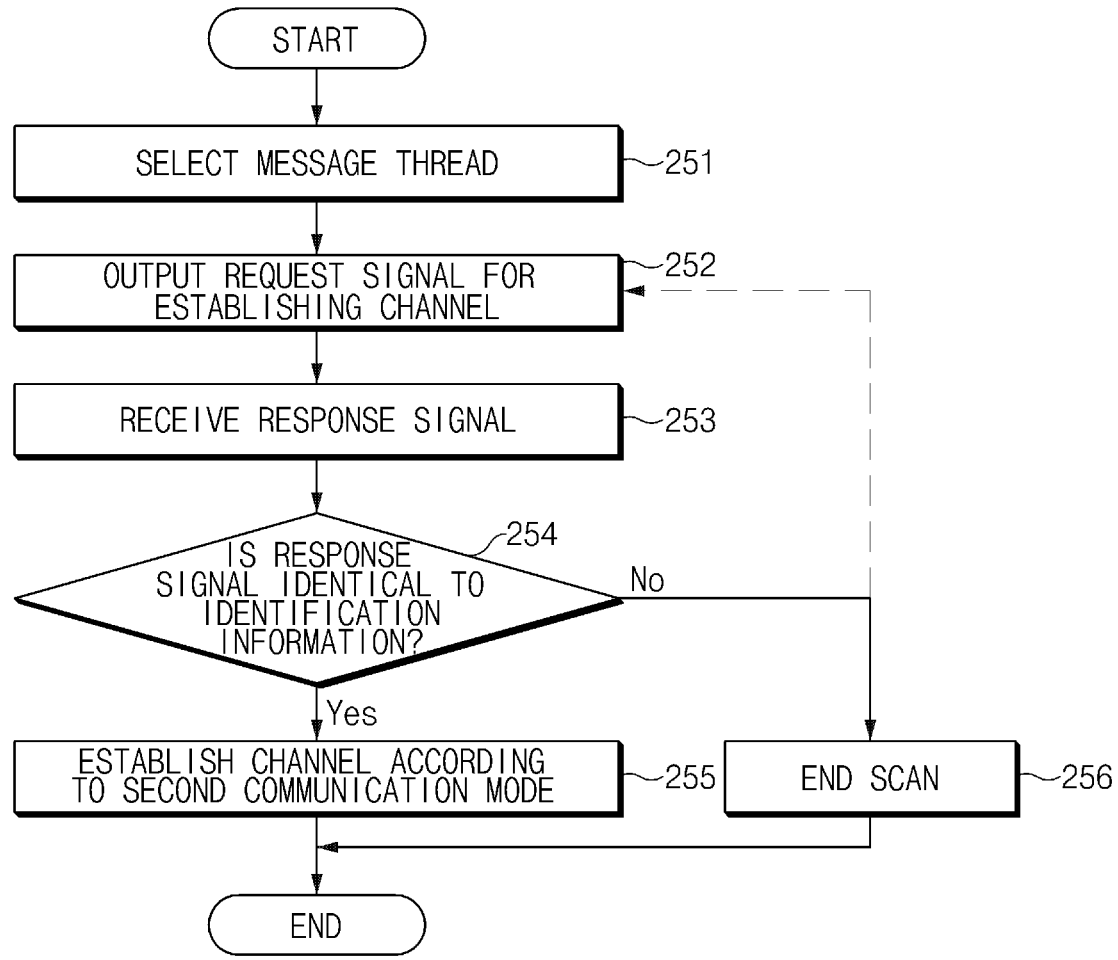
FIG. 2B is a flowchart illustrating a process of establishing a channel for a second communication mode, according to an embodiment.

FIG. 2B is a flowchart illustrating a process of establishing a channel depending on a second communication mode, according to an embodiment of the present disclosure.

In step 251, a processor 120 of FIG. 1 may select one message thread from a list of transmitted and received messages by a user input or an automatic setting.

In step 252, the processor 120 may output a request signal, such as a beacon signal, including hash information generated based on identification information, such as a phone number, of a first electronic device 101 of FIG. 1.

In step 253, the processor 120 may receive a response signal from a second electronic device 102 of FIG. 1. If the request signal of the first electronic device 101 is received, the second electronic device 102 may verify whether hash information included in the received request signal is identical to information of an internal list, such as a phone number stored in an address book.

If the hash information is identical to the information of the list, the second electronic device 102 may transmit a response signal including identification information of the second electronic device 102 to the first electronic device 101. According to embodiments of the present disclosure, the second electronic device 102 may include information, such as a connection password necessary for establishing a channel, according to a second communication mode, in a response signal and may transmit the response signal.

If a response signal is not received within a specified time, the processor 120 may end the device scan process or may perform step 252 again.

In step 254, the processor 120 may verify whether the received response signal is identical to identification information of the second electronic device 102 associated with the selected message thread.

In step 255, if the received response signal is identical to the identification information of the second electronic device 102, the processor 120 may establish the channel by the second communication mode between the first electronic device 101 and the second electronic device 102.

In step 256, if the received response signal is not identical to the identification information of the second electronic device 102, the processor 120 may end the scanning of the second electronic device 102 and inform a user that there is no device scanned around the first electronic device 101 (e.g., using a pop-up window) or may fail to perform a separate operation.

Figure 3:
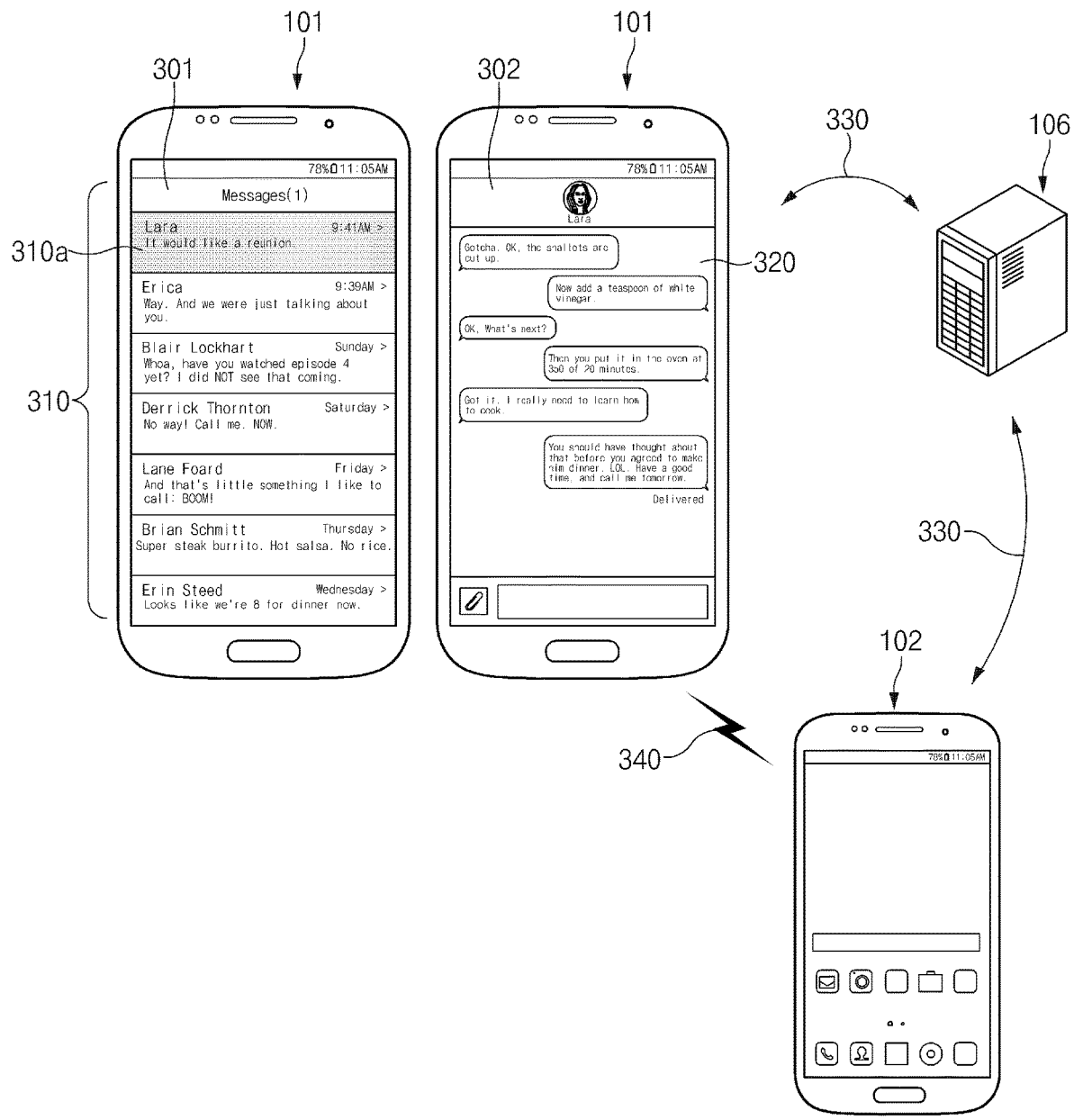
FIG. 3 illustrates communication with a second electronic device according to a first communication mode or a second communication mode, according to various embodiments.

FIG. 3 is a drawing illustrating communication with a second electronic device 102, according to a first communication mode or a second communication mode, according to embodiments of the present disclosure. In FIG. 3, one message thread is selected by a user input.

If a message transmission application is executed, a list 310 of transmitted and received messages may be displayed on screen 301. The list 310 of transmitted and received messages may have a form where a message thread 310a associated with a recently received message is displayed with an order and a time.

If a first electronic device 101 transmits and receives a message with a second electronic device 102 over a channel 330 according to a first communication mode, information about the transmitted and received message may be updated on the list 310 of transmitted and received messages.

If a user selects the one message thread 310a, a message output screen 320 for a counterpart may be displayed on screen 302. The message output screen 320 may include a phone number of the second electronic device 102 associated with the selected message thread 310a, user information of the second electronic device 102, and an interface for inputting a message.

If the message thread 310a is selected by the user or if the message output screen 320 is displayed, a processor 120 of FIG. 1 may establish a channel 340 according to a second communication mode, such as Wi-Fi direct, with the second electronic device 102.

The first electronic device 101 may transmit media data or the like, a size of which is relatively large, using the channel 340 according to the second communication mode which does not generate a communication fee to reduce billing like the first communication mode, such as cellular communication. Further, if the channel 340, according to the second communication mode, has a little influence on a communication environment and has a fast data transmission rate, the first electronic device 101 may increase transmission efficiency of media data or a large amount of data using the second communication mode.

The first electronic device 101 may process message data transmitted and received over the channel 330 by the first communication mode which is a long-range communication mode and the channel 340, according to the second communication mode which is a short-range communication mode, through one user interface, and may provide a simple and intuitive data communication method to the user.

Figure 4A:
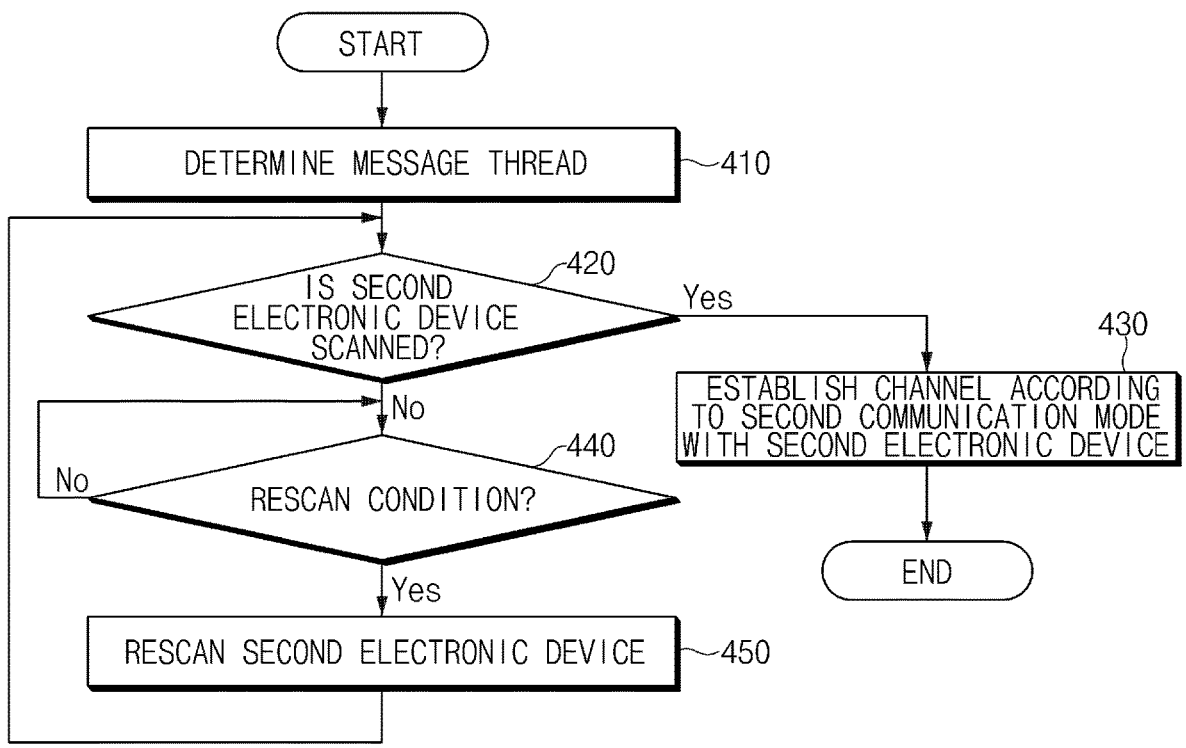
FIG. 4A is a flowchart illustrating a process of re-scanning a second electronic device, according to various embodiments.

FIG. 4A is a flowchart illustrating a process of re-scanning a second electronic device, according to embodiments of the present disclosure.

In step 410, a processor 120 of FIG. 1 may determine a message thread by a user input or an automatic setting.

In step 420, the processor 120 may scan a second electronic device 102 around a first electronic device 101, such as within a range where a second communication mode is possible, based on identification information of the second electronic device 102 associated with the determined message thread.

In step 430, if the second electronic device 102 around the first electronic device 101 is scanned, the processor 120 may establish a channel according to the second communication mode with the scanned second electronic device 102.

In step 440, if the second electronic device 102 around the first electronic device 101 is not scanned, the processor 120 may verify whether a rescan condition occurs, such as if at least one of a condition where a specified time elapses or a condition where a user starts to transmit data of a specified format (e.g., an image video).

In step 450, if the rescan condition occurs, the processor 120 may perform an operation of scanning the second electronic device 102 again in step 420.

Figure 4B:
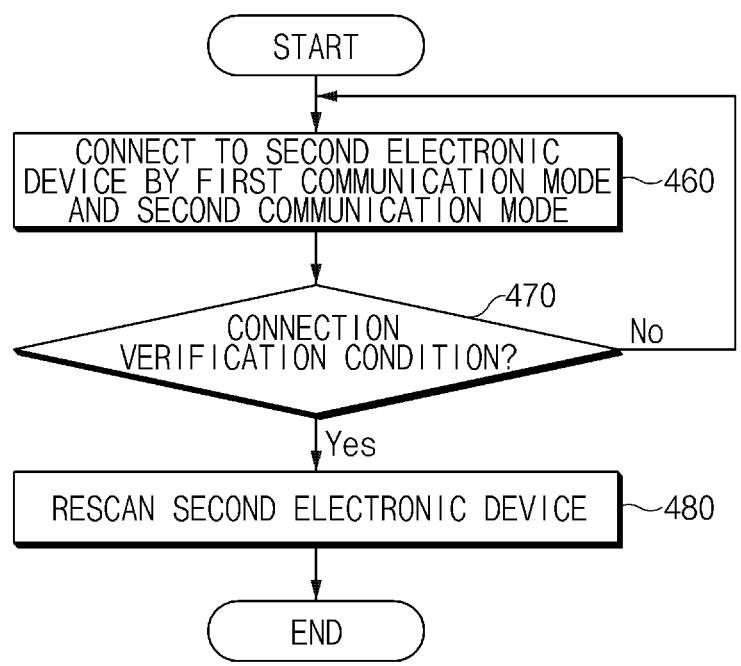
FIG. 4B is a flowchart illustrating a process of re-scanning a second electronic device after a channel is established according to a second communication mode, according to various embodiments.

FIG. 4B is a flowchart illustrating a process of re-scanning a second electronic device after a channel is established according to a second communication mode, according to various embodiments of the present disclosure.

In step 460, a processor 120 of FIG. 1 may be connected with a second electronic device 102 by a first communication mode and a second communication mode.

In step 470, the processor 120 may verify occurrence of a connection verification condition which may include at least one of a condition where a specified time elapses or a condition where data of a specified format (e.g., an image video) is transmitted. The processor 120 may verify whether the second electronic device 102 departs from a communication range during communication in a state where the second electronic device 102 is scanned to reduce a possibility that a message transmission error using the second communication mode will occur.

In step 480, if the connection verification condition occurs, the processor 120 may rescan the second electronic device 102. If configuration information for establishing a channel according to the second communication mode is previously stored, the processor 102 may use the stored configuration information. If the connection verification condition does not occur, the processor 120 may maintain the state where the first electronic device 101 is connected with the second electronic device 102 by the first communication mode and the second communication mode.

According to embodiments of the present disclosure, a data transmission method performed in an electronic device includes executing a message transmission application configured to transmit and receive data through a first communication mode, selecting at least one message thread from a list of messages transmitted and received in the message transmission application, and establishing a channel according to a second communication mode with an external electronic device based on identification information of the external electronic device associated with the selected message thread.

According to embodiments of the present disclosure, the data transmission method further includes displaying a connection indication about the establishment of the channel on at least part of a message output screen according to the selection of the message thread.

According to embodiments of the present disclosure, the data transmission method further includes transmitting message data using at least one of the first communication mode or the second communication mode based on a type or size of the message data transmitted to the external electronic device through the message transmission application.

According to embodiments of the present disclosure, the data transmission method further includes transmitting transmission history information of data transmitted and received over the channel to an external server which processes data according to the first communication mode.

According to embodiments of the present disclosure, the selecting of the at least one message thread includes executing a message thread selected by a user input or automatic execution.

Figure 5:
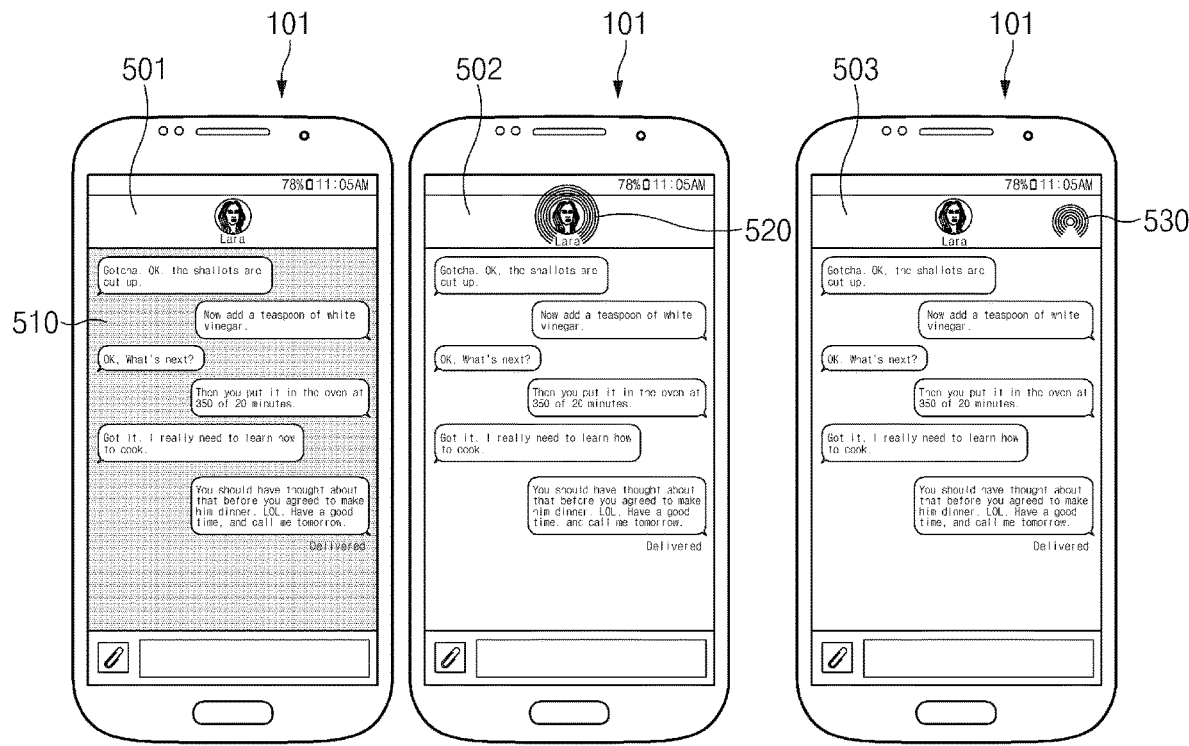
FIG. 5 illustrates a process of outputting a connection indication according to a second communication mode, according to various embodiments.

FIG. 5 is a drawing illustrating a process of outputting a connection indication according to a second communication mode, according to embodiments of the present disclosure.

If a channel by a second communication mode is established with a second electronic device 102 of FIG. 1, a processor 120 of FIG. 1 may output a connection indication about establishing the channel on at least part of message output screens 501 to 503. A user may verify the connection indication to recognize a state where second communication by short-range communication is possible.

On the message output screen 501, the processor 120 may change a background color 510 of the message output screen 510 to inform a state when the second communication is possible. For example, if the second communication is possible and connected, the processor 120 may change the background color 510 from a default background screen color to a specified color. In FIG. 5, the background color 510 is changed, although embodiments are not limited thereto. For example, a color, or a background color, of another part, such as a status bar, a text input window, or a transmit and receive message, on a screen may be changed.

On the message output screen 502, the processor 120 may apply an animation effect on an object on a screen to inform the state when the second communication is possible. For example, the processor 120 may display an animation image 520 that changes over a specified time, on a profile image of a counterpart user to inform the state when the second communication is possible.

On the message output state 503, the processor 120 may output a touch button, or an icon, 530 to inform the state where the second communication is possible. For example, if the user executes the touch button 530, a user interface (UI) for selecting a file to be transmitted by the second communication and/or a guide message, such as a pop-up notification or a voice notification, for providing notification that the second communication is possible may be output.

Figure 6:
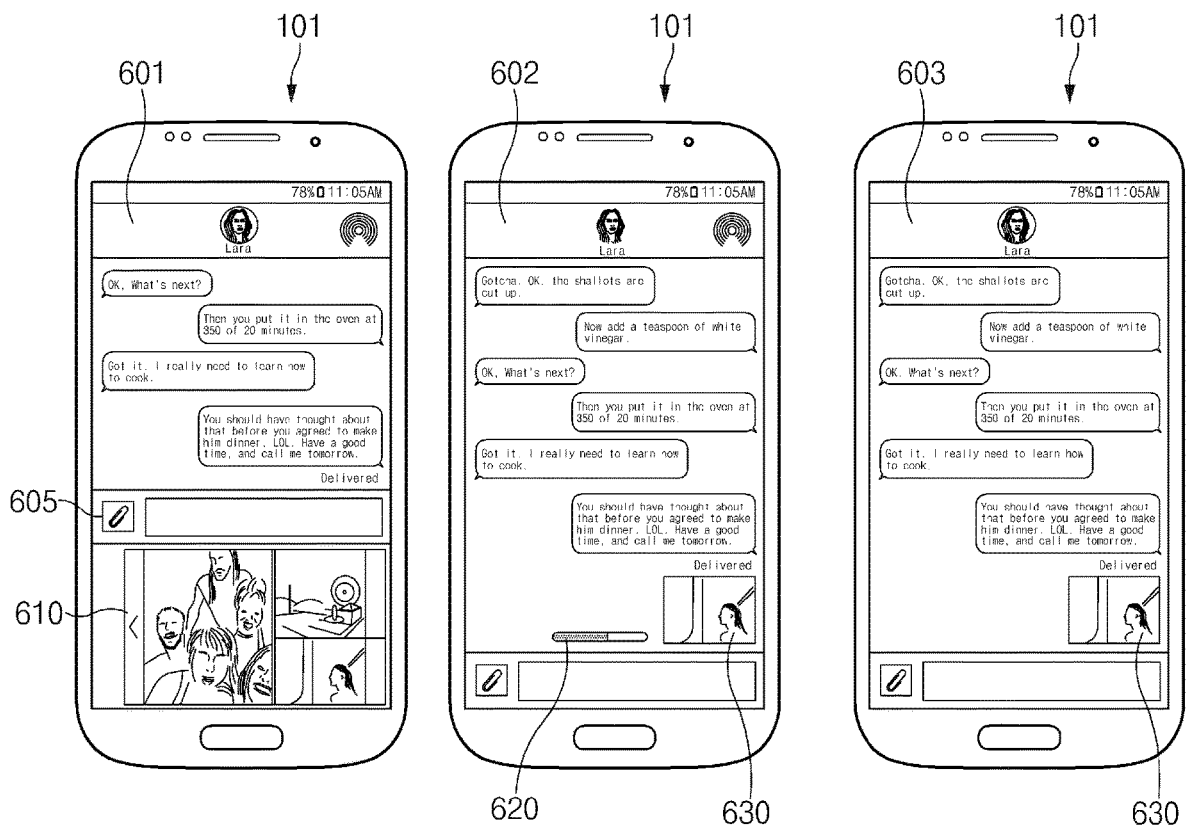
FIG. 6 illustrates a process of transmitting message data according to a second communication mode, according to various embodiments.

FIG. 6 is a drawing illustrating a process of transmitting message data according to a second communication mode, according to various embodiments of the present disclosure.

If a user touches a file attachment button 605 on a message output screen 601, a list 610 of transmissible files may be output on a screen. For example, the list 610 of transmissible files may include a media file, such as a photo or a video, or a large amount of files in a first electronic device 101.

If the user selects one file in the list 610 of transmissible files on a message output screen 602, a file selected through a second communication mode may be transmitted to a second electronic device 102. The processor 120 of FIG. 1 may output a transmission state 620 of a transmitted file or a thumbnail image 630 on the message output screen 602.

The processor 120 may display transmission and reception information, such as the transmission state 620 or the thumbnail image 630, of message data by the second communication mode to be different from a first communication mode. For example, the processor 120 may display message data of a general text form by the first communication mode using a black periphery and may display the transmission state 620 or the thumbnail image 630 by the second communication mode using a blue periphery.

If the transmission of the message data by the second communication mode is completed on a message output screen 603, the processor 120 may continue maintaining a transmission record on the message output screen 603. The processor 120 may process message data according to the first communication mode or the second communication mode in one user interface.

According to embodiments of the present disclosure, the processor 120 may transmit a transmission history according to the second communication mode to an external server which processes message data according to the first communication mode. The processor 120 may transmit history information about short-range communication generated around the first electronic device 101 to an external server which processes a message depending on cellular communication and may perform synchronization necessary for driving a message transmission application. Additional information about the transmission of the history information may be provided with reference to FIG. 9.

Figure 7:
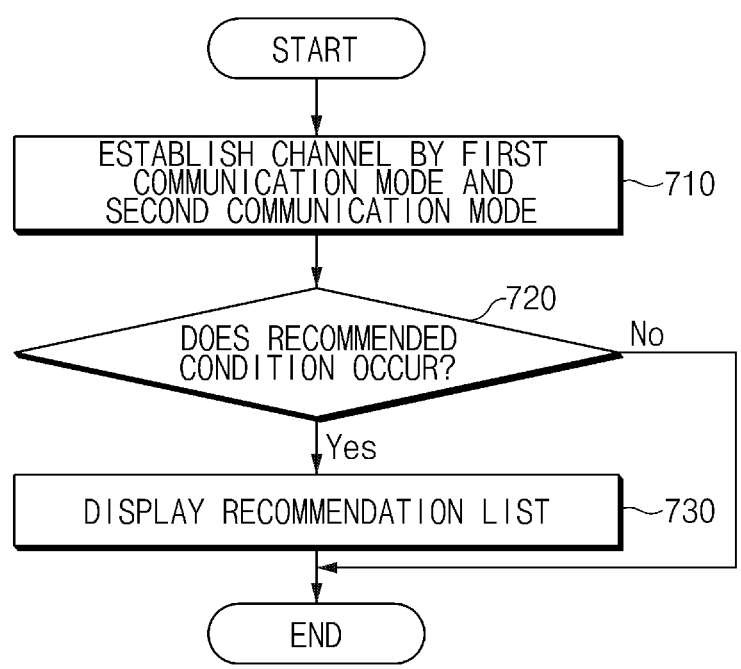
FIG. 7 is a flowchart illustrating recommendation of message data using a second communication mode, according to various embodiments.

FIG. 7 is a flowchart illustrating recommendation of message data using a second communication mode, according to various embodiments of the present disclosure.

In step 710, a processor 120 of FIG. 1 may establish a channel with a second electronic device 102 of FIG. 1 by a first communication mode and a second communication mode.

In step 720, the processor 120 may verify an occurrence of a recommended condition using the second communication mode. The recommended condition may be a condition, for example, if a user requests to recommend a file to be transmitted, such as if the user touches a specified button, or if the user touches a file addition button.

In step 730, the processor 120 may display a recommendation list based on expansion information associated with identification information of the second electronic device 102. For example, the expansion information may be user information of the second electronic device 102, stored in connection with a phone number of the second electronic device 102, an image, an audio, or a video. The expansion information may be information stored together with the phone number of the second electronic device 102 in an address book. The processor 120 may search for an image file, an audio file, or a video file stored in a first electronic device 101 based on expansion information stored in the address book and may output the found file as a recommendation list.

Figure 8:
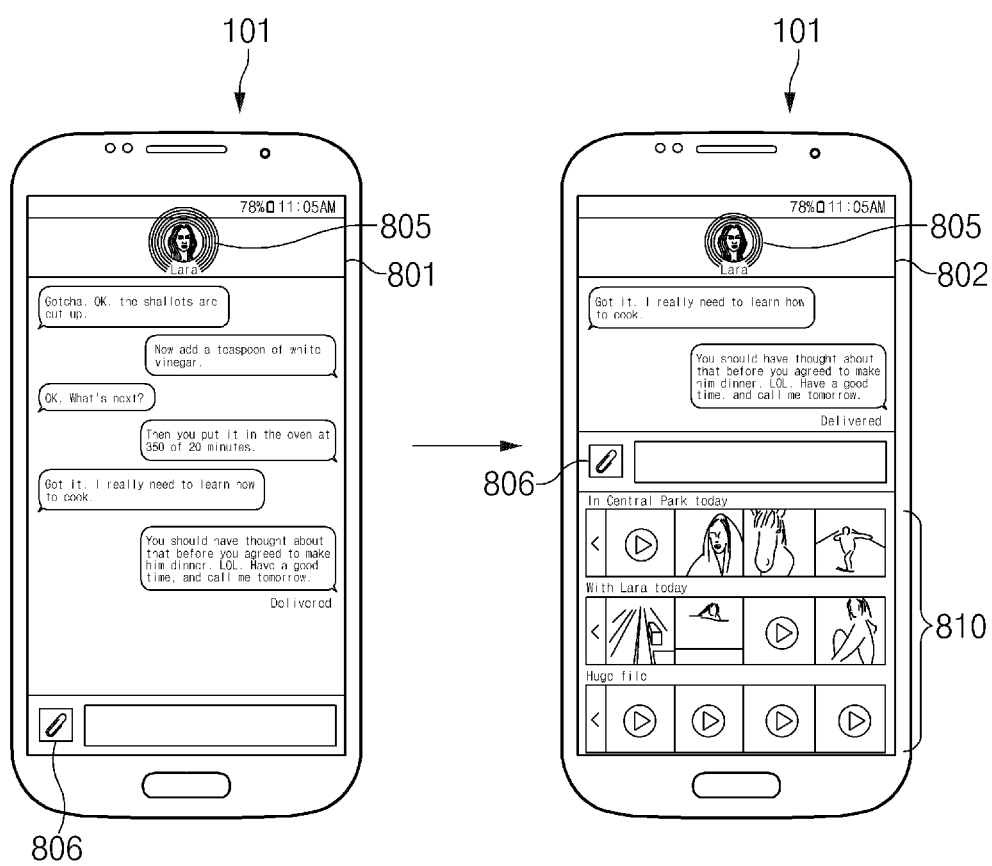
FIG. 8 illustrates a screen for outputting a recommendation list, according to various embodiments.

FIG. 8 is a drawing illustrating a screen for outputting a recommendation list, according to an embodiment of the present disclosure when a user pushes a file attachment button, and a recommendation list is output. On a message output screen 801, a processor 120 of FIG. 1 may establish a channel with a second electronic device 102 by each of a first communication mode and a second communication mode. If the channel by the second communication mode is established, a connection indication, such as an animation effect, 805 may be output on part of the message output screen 801.

If a user touches a file attachment button 806 to attach a file, a recommendation list 810 may be output on the message output screen 801. For example, the recommendation list 810 may include a media file associated with a word extracted from text data of a message, or a media file associated with a name or photo of a counterpart, among media files such as various photos and videos. On the other hand, the recommendation list 810 may include a recently captured video or a video with the largest file size, among a large amount of video files.

Figure 9:
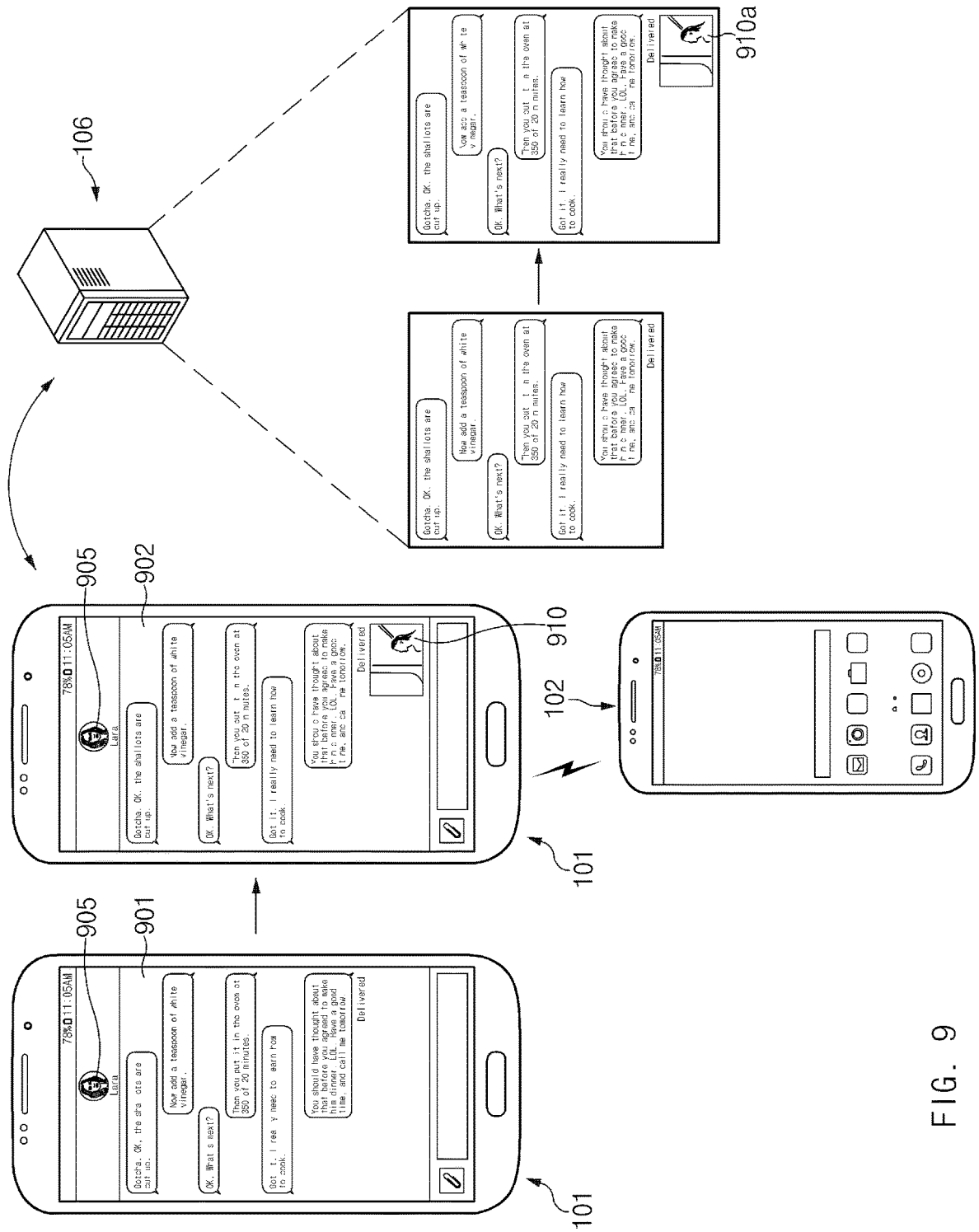
FIG. 9 illustrates synchronization with a server for first communication, according to various embodiments.

FIG. 9 is a drawing illustrating synchronization with a server for first communication, according to various embodiments of the present disclosure.

On a message output screen 901, a processor 120 of FIG. 1 may establish a channel with a second electronic device 102 by each of a first communication mode and a second communication mode. If a channel by the second communication mode is established, a connection indication, such as an animation effect, 905 may be output on part of the message output screen 901.

If transmission of message data 910 by the second communication mode is completed on a message output screen 902, the processor 120 may transmit a transmission history of the message data 910 according to the second communication mode to a server 106 which processes message data according to the first communication mode. In an embodiment, data about a transmission history may be image data, such as a thumbnail image. The data about the transmission history may be text data of a log form including information such as a file name, a file size, and a transmission time.

The server 106 may perform synchronization necessary for driving a message transmission application based on history information received from a first electronic device 101. The server 106 may update a message transmission record between the first electronic device 101 and the second electronic device 102, stored therein. The server 106 may add short-range communication transmission information 910a about the message data 910 in a message transmission history stored therein and may add message data using the first communication mode, generated after the short-range communication transmission information 910a. FIG. 9 illustrates a thumbnail image being stored in the server 106. Additionally, a message transmission record may be updated in the server 106 based on text data of a log form.

Figure 10:
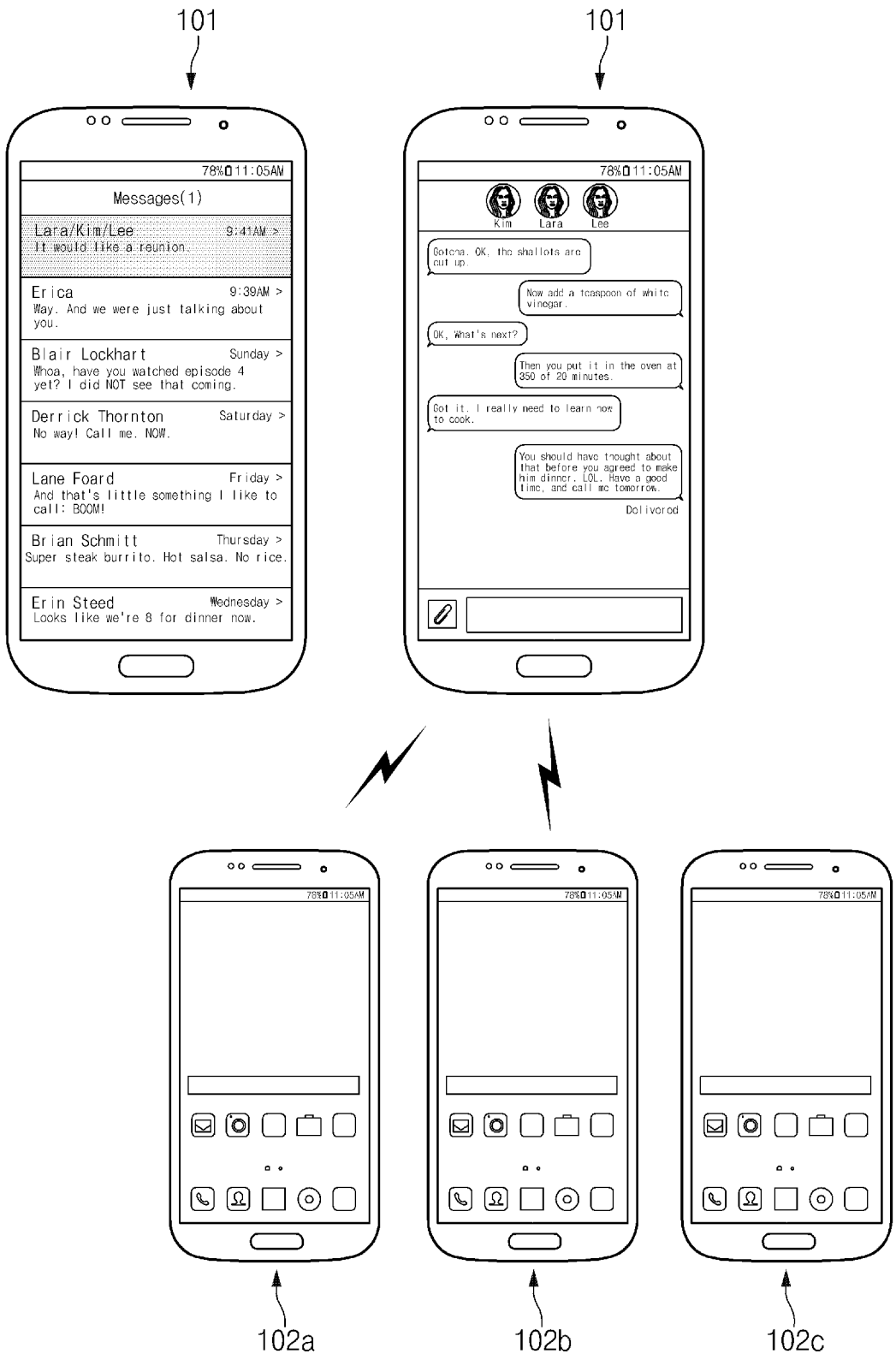
FIG. 10 illustrates a process of transmitting a message with a plurality of counterparts, according to various embodiments.

FIG. 10 is a drawing illustrating a process of transmitting a message with a plurality of counterparts, according to various embodiments of the present disclosure.

If collecting identification information of each of a plurality of second electronic devices 102a to 102c based on one message thread, such as a group chat room, a processor 120 of FIG. 1 may transmit message data of a second communication mode based on the identification information.

The processor 120 may scan whether there is a device located around a first electronic device 101 among the second electronic devices 102a to 102c based on the identification information of each of the plurality of second electronic devices 102a to 102c. If the second electronic devices 102a and 102b are located around the first electronic device 101, the processor 120 may transmit message data of a photo or video to the second electronic devices 102a and 102b using a channel of the second communication mode. The processor 120 may transmit message data to the second electronic device 102c, which is not located around the first electronic device 101, using cellular communication or may cancel transmission of message data.

According to embodiments of the present disclosure, the processor 120 may display whether a channel of the second communication mode is established or whether message data is transmitted over the channel of the second communication mode with respect to each of the plurality of second electronic devices 102a to 102c in different ways, such as with different background colors.

Figure 11:
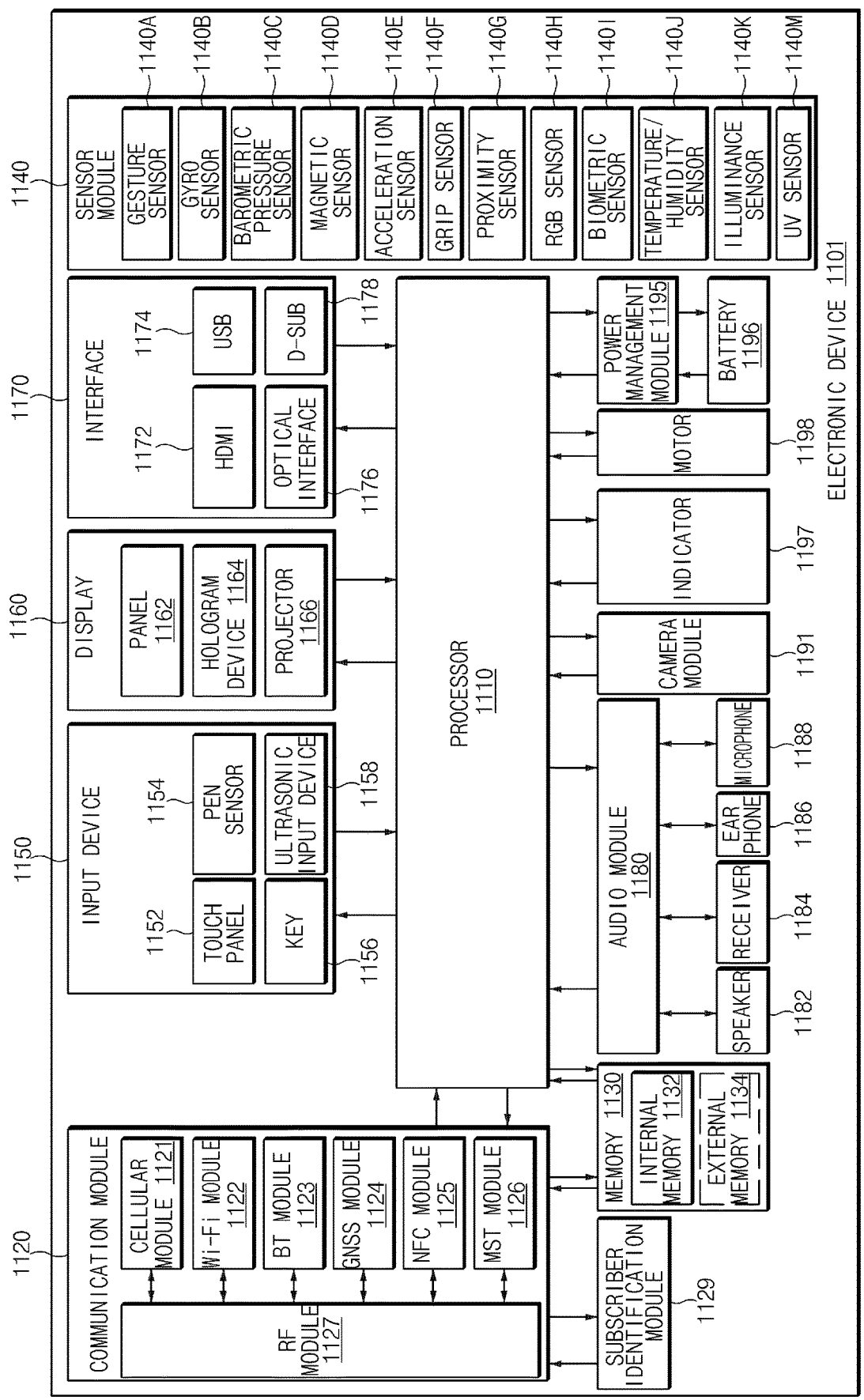
FIG. 11 is a block diagram illustrating a configuration of an electronic device, according to various embodiments.

FIG. 11 is a block diagram illustrating an electronic device, according to an embodiment of the present disclosure.

An electronic device 1101 may include a part or the entirety of the electronic device 101 illustrated in FIG. 1. The electronic device 1101 may include at least one processor 1110, such as an AP, a communication module 1120, a subscriber identification module (SIM) 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may run an operating system or an application program so as to control a plurality of hardware or software elements connected to the processor 1110, and may process various data and perform operations. The processor 1110 may be implemented with a system on chip (SoC) and may further include a graphic processing unit (GPU) and/or an image signal processor. The processor 1110 may load, on a volatile memory, an instruction or data received from at least one of other elements, such as a nonvolatile memory, to process the instruction or data, and may store various data in a nonvolatile memory.

The communication module 1120 may have a configuration that is the same as or similar to that of the communication interface 170 of FIG. 1 and may include a cellular module 1121, a Wi-Fi module 1122, a Bluetooth® (BT) module 1123, a GNSS module 1124, such as a GPS module, a GLONASS module, a BeiDou module, or a Galileo module, an NFC module 1125, an MST module 1126, and a radio frequency (RF) module 1127.

A cellular module 1121 may provide a voice call service, a video call service, a text message service, or an Internet service through a communication network. The cellular module 1121 may identify and authenticate the electronic device 1101 in the communication network using a SIM card, may perform at least a part of functions that may be provided by the processor 1110, and may include a communication processor (CP).

Each of the Wi-Fi module 1122, the Bluetooth module 1123, the GNSS module 1124 and the NFC module 1125 may include a processor for processing data transmitted/received through the modules. According to some embodiments of the present disclosure, at least two or more of the cellular module 1121, the Wi-Fi module 1122, the Bluetooth module 1123, the GNSS module 1124, and the NFC module 1125 may be included in a single integrated chip (IC) or IC package.

The RF module 1127 may transmit/receive communication signals, such as RF signals, and may include a transceiver, a power amp module (PAM), a frequency filter, a low noise amplifier (LNA), or an antenna. According to another embodiment of the present disclosure, at least one of the cellular module 1121, the Wi-Fi module 1122, the Bluetooth module 1123, the GNSS module 1124, or the NFC module 1125 may transmit/receive RF signals through a separate RF module.

The SIM 1129 may include an embedded SIM and/or a card containing the SIM, and may include unique identification information, such as an integrated circuit card identifier (ICCID) or subscriber information, such as international mobile subscriber identity (IMSI).

The memory 1130 may include, for example, an internal memory 1132 or an external memory 1134. The internal memory 1132 may include at least one of a volatile memory, such as a dynamic RAM (DRAM), a static RAM (SRAM), or a synchronous dynamic RAM (SDRAM, a nonvolatile memory, such as a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1134 may include a flash drive such as a compact flash (CF), a secure digital (SD), a micro-SD, a mini-SD, an extreme digital (xD), a multimediacard (MMC), or a memory stick. The external memory 1134 may be operatively and/or physically connected to the electronic device 1101 through various interfaces.

The sensor module 1140 may measure a physical quantity or detect an operation state of the electronic device 1101 so as to convert measured or detected information into an electrical signal and may include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 114011, such as a red/green/blue (RGB) sensor, a biometric sensor 11401, a temperature/humidity sensor 1140J, an illumination sensor 1140K, or an ultraviolet (UV) sensor 1140M. The sensor module 1140 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In some embodiments of the present disclosure, the electronic device 1101 may further include a processor configured to control the sensor module 1140 as a part of the processor 1110 or separately, so that the sensor module 1140 is controlled while the processor 1110 is in a sleep state.

The input device 1150 may include a touch panel 1152, a (digital) pen sensor 1154, a key 1156, and an ultrasonic input device 1158. The touch panel 1152 may employ at least one of capacitive, resistive, infrared, and ultraviolet sensing methods, may further include a control circuit, and may further include a tactile layer so as to provide a haptic feedback to a user.

The (digital) pen sensor 1154 may include a sheet for recognition which is a part of a touch panel or is separate. The key 1156 may include a physical button, an optical button, or a keypad. The ultrasonic input device 1158 may sense ultrasonic waves generated by an input tool through a microphone 1188 so as to identify data corresponding to the ultrasonic waves sensed.

The display 1160 may include a panel 1162, a hologram device 1164, or a projector 1166. The panel 1162 may be flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed in the inside or the outside of the electronic device 1101. The display 1160 may further include a control circuit for controlling the panel 1162, the hologram device 1164, or the projector 1166.

The interface 1170 may include an HDMI 1172, a USB 1174, an optical interface 1176, and a D-subminiature (D-sub) 1178 and may be included in the communication interface 170 illustrated in FIG. 1. The interface 1170 may include a mobile high-definition link (MHL) interface, an SD card/multi-media card (MMC) interface, or an Infrared Data Association (IrDA) interface.

The audio module 1180 may convert a sound into an electrical signal or vice versa. At least a portion of elements of the audio module 1180 may be included in the input/output interface 150 illustrated in FIG. 1. The audio module 1180 may process sound information input or output through a speaker 1182, a receiver 1184, an earphone 1186, or the microphone 1188.

The camera module 1191 is for shooting a still image or a video. According to an embodiment of the present disclosure, the camera module 1191 may include at least one image sensor, such as a front sensor or a rear sensor, a lens, an image signal processor (ISP), or a flash, such as an LED or a xenon lamp.

The power management module 1195 may manage power of the electronic device 1101 and may include a power management integrated circuit (PMIC), a charger integrated circuit (IC), or a battery gauge. The PMIC may employ a wired and/or wireless charging method. The wireless charging method may include a magnetic resonance method, a magnetic induction method, or an electromagnetic method. An additional circuit for wireless charging, such as a coil loop, a resonant circuit, or a rectifier may be further included. The battery gauge may measure a remaining capacity of the battery 1196 and a voltage, current or temperature thereof while the battery is charged. The battery 1196 may include a rechargeable battery and/or a solar battery.

The indicator 1197 may display a specific state of the electronic device 1101 or a part thereof, such as a booting state, a message state, or a charging state. The motor 1198 may convert an electrical signal into a mechanical vibration, and may generate a vibration or haptic effect. A processing device, such as a GPU, for supporting a mobile TV may be included in the electronic device 1101. The processing device for supporting a mobile TV may process media data according to the standards of digital multimedia broadcasting (DMB), digital video broadcasting (DVB), or Media-FLO™.

Each of the elements described herein may be configured with one or more components, and the names of the elements may be changed according to the type of an electronic device. In embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to embodiments of the present disclosure, an electronic device includes a display, a communication interface, a processor configured to be electrically connected with the display and the communication interface, and a memory configured to be electrically connected with the processor, wherein the memory stores instructions, and wherein the instructions cause the processor to execute a message transmission application configured to transmit and receive data through a first communication mode, select at least one message thread from a list of messages transmitted or received in the message transmission application, and establish a channel according to a second communication mode with an external electronic device based on identification information of the external electronic device associated with the selected message thread.

According to embodiments of the present disclosure, the instructions cause the processor to output a connection indication about the establishment of the channel on at least part of a message output screen according to the selection of the message thread.

According to embodiments of the present disclosure, the connection indication is displayed through at least one of a change in background color, generation of an icon, generation of a touch button, or an animation effect on an object on the screen.

According to embodiments of the present disclosure, the instructions cause the processor to transmit message data using at least one of the first communication mode or the second communication mode based on a type or size of the message data transmitted to the external electronic device through the message transmission application.

According to embodiments of the present disclosure, the instructions cause the processor to transmit the media file using the second communication mode if the message data is a media file including an image or video.

According to embodiments of the present disclosure, the instructions cause the processor to transmit the message data using the second communication mode if the message data is a file of a specified size or more.

According to embodiments of the present disclosure, the instructions cause the processor to rescan the external electronic device after the channel is established, if a connection verification condition occurs.

According to embodiments of the present disclosure, the connection verification condition comprises at least one of a condition where a specified time elapses or a condition where data of a specified format is transmitted.

According to embodiments of the present disclosure, the instructions cause the processor to rescan the external electronic device if it fails to establish the channel and if a rescan condition occurs.

According to embodiments of the present disclosure, the rescan condition comprises at least one of a condition where a specified time elapses or a condition where data of a specified format is transmitted.

According to embodiments of the present disclosure, the instructions cause the processor to transmit transmission history information of data transmitted and received over the channel to an external server which processes data according to the first communication mode.

According to embodiments of the present disclosure, the instructions cause the processor to determine a message thread selected by a user input or automatic execution.

According to embodiments of the present disclosure, the instructions cause the processor to automatically determine the message thread based on at least one of a time when a message is transmitted and received, the number of times the message is transmitted and received, or call history information.

According to embodiments of the present disclosure, the identification information comprises at least one of a name or a phone number of a counterpart user with which a message is transmitted and received.

According to embodiments of the present disclosure, the first communication mode is a data transmission mode according to cellular communication, and the second communication mode is a data transmission mode according to short-range communication performed in an area within a specified distance of the electronic device.

Figure 12:
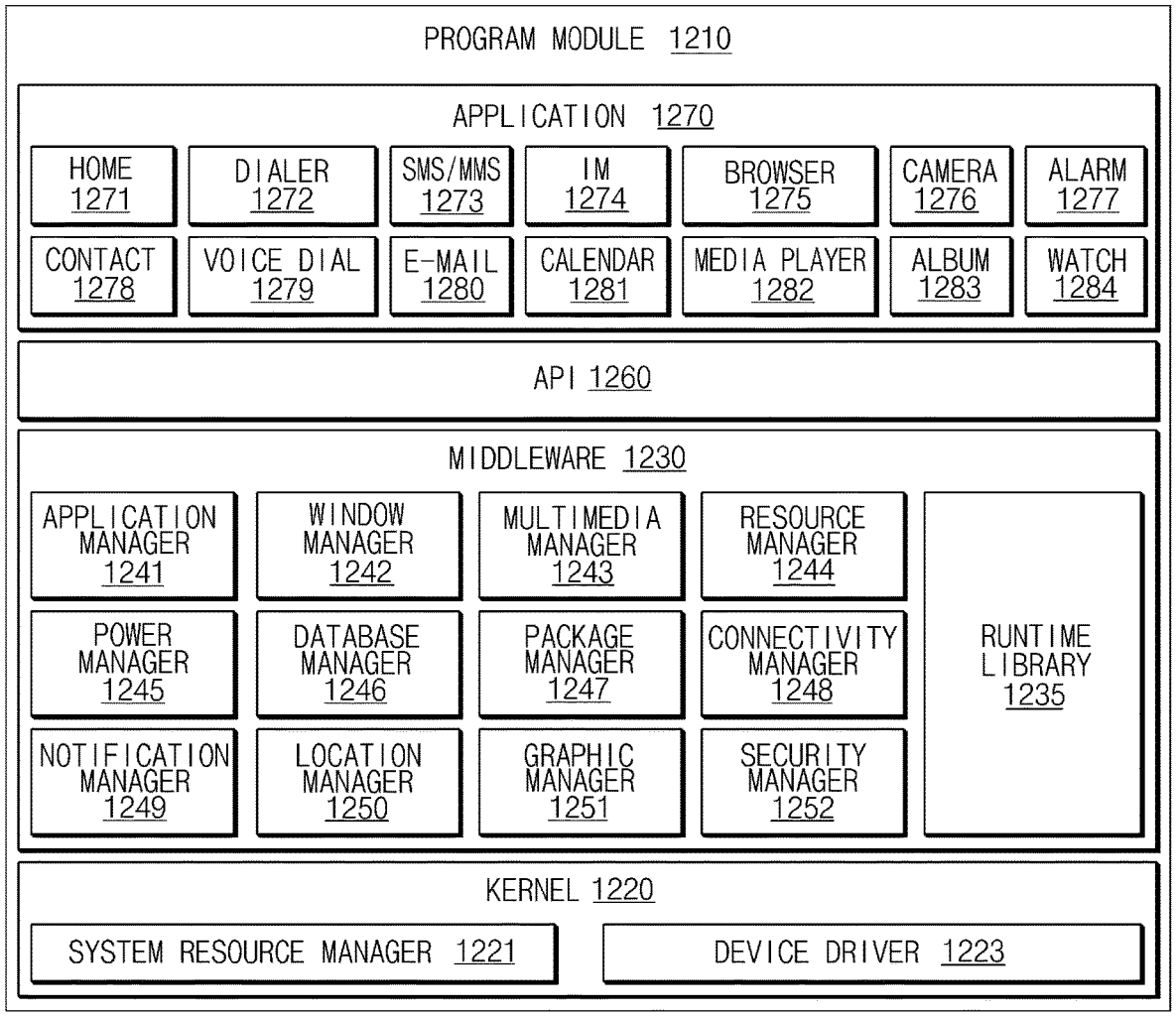
FIG. 12 is a block diagram illustrating a configuration of a program module, according to various embodiments.

FIG. 12 is a block diagram illustrating a program module according to an embodiment of the present disclosure.

A program module 1210 may include an OS for controlling a resource related to an electronic device and/or various applications running on the OS. The operating system may be Android®, iOS®, Windows®, Symbian®, or Tizen®.

The program module 1210 may include a kernel 1220, a middleware 1230, an API 1260, and/or an application 1270. At least a part of the program module 1210 may be preloaded on an electronic device or may be downloaded from an external electronic device, such as the first electronic device 102, the second external electronic device 104, or the server 106.

The kernel 1220 may include a system resource manager 1221 or a device driver 1223. The system resource manager 1221 may perform control, allocation, or retrieval of a system resource and may include a process management unit, a memory management unit, or a file system management unit. The device driver 1223 may include a display driver, a camera driver, a Bluetooth driver, a shared memory driver, a USB driver, a keypad driver, a Wi-Fi driver, an audio driver, or an inter-process communication (IPC) driver.

The middleware 1230 may provide a function that the applications 1270 require in common, or may provide various functions to the applications 1270 through the API 1260 so that the applications 1270 may efficiently use limited system resources in the electronic device. According to an embodiment of the present disclosure, the middleware 1230 may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235 may include a library module that a compiler uses to add a new function through a programming language while the application 1270 is running. The runtime library 1235 may perform a function for input/output management, memory management, or an arithmetic function.

The application manager 1241 may mange a life cycle of at least one of the applications 1270. The window manager 1242 may manage a GUI resource used in a screen. The multimedia manager 1243 may recognize a format required for playing various media files and may encode or decode a media file using a codec matched to the format. The resource manager 1244 may manage a resource such as a source code, a memory, or a storage space of at least one of the applications 1270.

The power manager 1245 may operate together with a basic input/output system (BIOS) to manage a battery or power and may provide power information required for operating the electronic device. The database manager 1246 may generate, search, or modify a database to be used in at least one of the applications 1270. The package manager 1247 may manage an installation or an update of an application distributed in a package file format.

The connectivity manger 1248 may manage wireless connection of Wi-Fi, or Bluetooth®. The notification manager 1249 may display or notify an event such as message arrival, appointments, and proximity alerts in such a manner as not to disturb a user. The location manager 1250 may manage location information of the electronic device. The graphic manager 1251 may manage a graphic effect to be provided to a user or a user interface related thereto. The security manager 1252 may provide various security functions required for system security or user authentication. According to an embodiment of the present disclosure, in the case in which an electronic device includes a phone function, the middleware 1230 may further include a telephony manager for managing a voice or video call function of the electronic device.

The middleware 1230 may include a middleware module for forming a combination of various functions of the above-mentioned elements. The middleware 1230 may provide a module specialized for each type of an operating system to provide differentiated functions. Furthermore, the middleware 1230 may delete a part of existing elements or may add new elements dynamically.

The API 1260 which is a set of API programming functions may be provided in different configurations according to an operating system. In the case of Android® or iOS®, one API set may be provided for each platform, and, in the case of Tizen®, at least two API sets may be provided for each platform.

The application 1270 may include at least one application capable of performing functions such as a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, a watch 1284, health care, such as measure an exercise amount or blood sugar, or environmental information provision (e.g., provide air pressure, humidity, or temperature information).

According to an embodiment of the present disclosure, the applications 1270 may include an information exchange application for supporting information exchange between the electronic device and an external electronic device. The information exchange application may include a notification relay application for relaying specific information to the external electronic device or a device management application for managing the external electronic device.

The notification relay application may have a function for relaying, to an external electronic device, notification information generated in another application, such as an SMS/MMS application, an e-mail application, a health care application, or an environmental information application of the electronic device. Furthermore, the notification relay application may receive notification information from the external electronic device and may provide the received notification information to the user.

The device management application may install, delete, or update at least one function, such as turn-on/turn off of the external electronic device itself (or some elements) or the brightness (or resolution) adjustment of a display, of the external electronic device communicating with the electronic device, an application running in the external electronic device, or a service, such as a call service or a message service, provided from the external electronic device.

According to an embodiment of the present disclosure, the applications 1270 may include a specified application, such as a healthcare application of a mobile medical device, according to an attribute of the external electronic device. The application 1270 may include an application received from an external electronic device. The application 1270 may include a preloaded application or a third-party application downloadable from a server. The names of the elements of the program module 1210 may vary with the type of operating system.

According to embodiments of the present disclosure, at least a part of the program module 1210 may be implemented with software, firmware, hardware, or a combination thereof. At least a part of the program module 1210 may be executed by a processor. At least a part of the program module 1210 may include a module, a program, a routine, sets of instructions, or a process for performing at least one function.

The term "module" used herein may represent a unit including one of hardware, software and firmware or a combination thereof. The term "module" may be interchangeably used with the terms "unit", "logic", "logical block", "component" and "circuit". The "module" may be a minimum unit of an integrated component or may be a part thereof and may be a minimum unit for performing one or more functions or a part thereof. The "module" may be implemented mechanically or electronically. The "module" may include at least one of an application-specific integrated circuit (ASIC) chip, a field-programmable gate array (FPGA), and a programmable-logic device for performing some operations, which are known or will be developed.

At least a part of modules, or functions thereof, or methods and operations, according to various embodiments of the present disclosure, may be implemented as instructions stored in a computer-readable storage medium in the form of a program module. In the case where the instructions are performed by a processor, the processor may perform functions corresponding to the instructions. The computer-readable storage medium may be the memory 130.

A computer-readable recording medium may include a hard disk, a floppy disk, a magnetic medium, such as a magnetic tape, an optical medium, such as CD-ROM, digital versatile disc (DVD), a magneto-optical medium, such as a floptical disk), or a hardware device, such as a ROM, a RAM, or a flash memory. The program instructions may include machine language codes generated by compilers and high-level language codes that can be executed by computers using interpreters. The above-mentioned hardware device may be configured to be operated as one or more software modules for performing operations of embodiments of the present disclosure and vice versa.

An electronic device may include a processor and a memory for storing computer-readable instructions. The memory may include instructions for performing the above-mentioned methods or functions when executed by the processor and may include instructions that, when executed by the processor, cause the processor to execute a message transmission application configured to transmit and receive data through a first communication mode, select at least one message thread from a list of messages transmitted and received in the message transmission application, and establish a channel according to a second communication mode with an external electronic device based on identification information of the external electronic device associated with the selected message thread.

A module or a program module according to embodiments of the present disclosure may include at least one of the above-mentioned elements, or some elements may be omitted or other additional elements may be added. Operations performed by the module, the program module or other elements may be performed in a sequential, parallel, iterative or heuristic way. Furthermore, some operations may be performed in another order or may be omitted, or other operations may be added.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display;
   a communication interface;
   a processor electrically connected with the display and the communication interface; and
   a memory electrically connected with the processor,
   wherein the memory stores instructions which cause the processor to:
      execute a message transmission application configured to transmit and receive data through a first communication mode;
      select at least one message thread from a list of messages transmitted or received in the message transmission application;
      send a request signal generated based on first identification information of an external device associated with the selected message thread;
      receive a response signal including second identification information; and
      establish a channel according to a second communication mode with an external electronic device based on the received response signal including the second identification information.

2. The electronic device of claim 1, wherein the instructions cause the processor to:
   output a connection indication about the establishment of the channel on at least part of a message output screen according to the selection of the message thread.

3. The electronic device of claim 2, wherein the connection indication is displayed through at least one of a change in background color, generation of an icon, generation of a touch button, or an animation effect on an object on the screen.

4. The electronic device of claim 1, wherein the instructions cause the processor to:
   transmit message data using at least one of the first communication mode or the second communication mode based on a type or size of the message data transmitted to the external electronic device through the message transmission application.

5. The electronic device of claim 4, wherein the instructions cause the processor to:
   if the message data is a media file including one of an image or video, transmit the media file using the second communication mode.

6. The electronic device of claim 4, wherein the instructions cause the processor to:
   if the message data is a file of at least a specified size, transmit the message data using the second communication mode.

7. The electronic device of claim 1, wherein the instructions cause the processor to:
   after the channel is established, if a connection verification condition occurs, rescan the external electronic device.

8. The electronic device of claim 7, wherein the connection verification condition comprises at least one of a condition where a specified time elapses or a condition where data of a specified format is transmitted.

9. The electronic device of claim 1, wherein the instructions cause the processor to:
   if the processor fails to establish the channel and if a rescan condition occurs, rescan the external electronic device.

10. The electronic device of claim 9, wherein the rescan condition comprises at least one of a condition where a specified time elapses or a condition where data of a specified format is transmitted.

11. The electronic device of claim 1, wherein the instructions cause the processor to:
   transmit transmission history information of data transmitted and received over the channel to an external server which processes data according to the first communication mode.

12. The electronic device of claim 1, wherein the instructions cause the processor to:
   determine a message thread selected by a user input or automatic execution.

13. The electronic device of claim 12, wherein the instructions cause the processor to:
   automatically determine the message thread based on at least one of a time when a message is transmitted and received, the number of times the message is transmitted and received, or call history information.

14. The electronic device of claim 1, wherein the identification information comprises at least one of a name or a phone number of a counterpart user with which a message is transmitted and received.

15. The electronic device of claim 1, wherein the first communication mode is a data transmission mode according to cellular communication, and wherein the second communication mode is a data transmission mode according to short-range communication performed in an area within a specified distance of the electronic device.

16. A data transmission method performed in an electronic device, the method comprising:
   executing a message transmission application configured to transmit and receive data through a first communication mode;
   selecting at least one message thread from a list of messages transmitted and received in the message transmission application;
   sending a request signal generated based on first identification information of an external device associated with the selected message thread;
   receiving a response signal including second identification information; and
   establishing a channel according to a second communication mode with an external electronic device based on the received response signal including the second identification information.

17. The method of claim 16, further comprising:
   displaying a connection indication about the establishment of the channel on at least part of a message output screen according to the selection of the message thread.

18. The method of claim 16, further comprising:
   transmitting message data using at least one of the first communication mode or the second communication mode based on a type or size of the message data transmitted to the external electronic device through the message transmission application.

19. The method of claim 18, further comprising:
   transmitting transmission history information of data transmitted and received over the channel to an external server which processes data according to the first communication mode.

20. The method of claim 16, wherein selecting the at least one message thread comprises:
   executing a message thread selected by a user input or automatic execution.

* * * * *